United States Patent [19]

Martens

[11] 3,909,719

[45] Sept. 30, 1975

[54] BALANCED PCM ENCODER

[75] Inventor: Jean Victor Martens, Deurne-Antwerp, Belgium

[73] Assignee: International Standard Electric Corporation, New York, N.Y.

[22] Filed: Dec. 5, 1973

[21] Appl. No.: 422,126

[30] Foreign Application Priority Data

Dec. 29, 1972 Belgium .............................. 793482

[52] U.S. Cl........... 325/38 B; 179/15 AP; 330/30 D

[51] Int. Cl.$^2$........................ H04B 1/00; H04B 7/00

[58] Field of Search.................. 179/15 AP, 15 AV; 325/38 R, 141, 38 B; 330/51, 144; 178/79, 68; 340/345; 332/9 R, 11 R, 11 D

[56] References Cited

UNITED STATES PATENTS

| | | | |
|---|---|---|---|
| 3,482,180 | 12/1969 | Martens | 330/51 |
| 3,582,941 | 6/1971 | LeMaout | 340/347 DA |

*Primary Examiner*—Robert L. Griffin
*Assistant Examiner*—Robert Hearn
*Attorney, Agent, or Firm*—John T. O'Halloran; Menotti J. Lombardi, Jr.; Alfred C. Hill

[57] ABSTRACT

This invention relates to the amplification circuitry, storage circuitry and encoding circuitry of a feedback comparison type PCM encoder. This circuitry incorporating a storage capacitor operates sequential on each analog signal sample of a plurality of such samples applied thereto in a TDM channel format. A balanced circuit arrangement incorporating differential amplifiers is employed for each of the above mentioned components of the PCM encoder. The capacitor is fed from the TDM input through a first gated differential amplifier. Then this amplifier is blocked by a second differential amplifier behaving as a variable impedance. The blocking of the first differential amplifier prevents leakage from the TDM input to a third differential amplifier which includes the storage capacitor. The charge of the capacitor, corresponding to the previous sample, is adjusted to each new sample at a constant current rate. Under this condition one capacitor terminal jumps towards the new potential impressed on that terminal and the other capacitor terminal moves linearly towards the new potential on the other terminal. A fourth differential amplifier is coupled across the capacitor and the output currents thereof are algebraically combined with the input currents derived from the previously coded sample by a digital-to-analog converter present in the feedback path of the encoder. The results of the algebraic addition of the two currents are provided as a balanced voltage input to a binary voltage comparator which provides the code representing the magnitude of the present sample.

15 Claims, 5 Drawing Figures

FIG.3

BALANCED PCM ENCODER

BACKGROUND OF THE INVENTION

This invention relates to PCM (pulse code modulation) encoders of the feedback comparison type and more particularly to input amplifier circuitry, storage circuitry and encoding circuitry constituting constituent components of such PCM encoders.

A signal amplification circuit including an amplifier and switching means to select either a high or a low gain value for the amplifier capable of being employed as the input amplifier circuitry of a feedback comparison type PCM encoder has already been disclosed in the U.S. Pat. No. 3,482,180. Therein, the amplifier was part of a compressor circuit used for PCM encoding systems and it includes two pairs of transistors with each pair arranged as a differential amplifier with commoned inputs and outputs. A further pair of transistors were used as switching means to supply a constant current to the differential amplifiers. The outputs of the two differential amplifiers were commoned at the respective collectors and with both differential amplifiers being supplied with current from the constant current source through respective switching transistors for the two differential amplifiers, the combined amplification arrangement provided a relatively high gain. Using a gating signal, one of the switching transistors could be blocked so that only one differential amplifier would then be active and the combined arrangement would thus only provide a relatively low gain. It was also envisioned that the gating signal could be coupled to either pair of transistors acting as a differential amplifier to be made conductive and a difference in the overall gain could still be obtained when each of the two differential amplifiers are designed to provide different gains.

An electrical signal storage circuit including a storage capacitor and input gating means to charge the capacitor from a source of input signals capable of being employed as the storage circuitry of a feedback comparison type PCM encoder has been disclosed, for instance, in the article by C. G. Davis entitled "An Experimental Pulse Code Modulation System For Short-haul Trunks", pages 1 to 24, The Bell System Technical Journal, January 1962. Thus, this aspect of the present invention may also be related to analog-to-digital conversion systems such as PCM encoding circuits. As disclosed in the above mentioned article, the storage capacitance successively receives analog amplitude channel samples from the various voice frequency circuits and after amplification through a compressor preamplifier, each sample appearing across the capacitance is encoded into multibit PCM signals. As noted in the article, each analog amplitude sample may be transferred to the common storage capacitance through an inductance in series with a gate. By using the resonant transfer method such that the gate is made conductive during one half of the resonant period of the inductance and the capacitance, in principle there is no energy loss of the transfer. This energy-sampling approach is not essential to PCM encoding but its use was then considered attractive in order to keep the signal level as high as possible before encoding. Indeed, the very high level of the control pulses means cross-talk problems and in this way one could hope to reduce interference to a reasonable level. Also, the stored signal should not vary while it is being encoded since this will cause cross-talk. Naturally, the input impedance of the following amplifier should be kept as possible to keep the voltage on the storage capacitance essentially constant while it is being coded.

Further, part of the available time should be reserved between the coding of each channel sample so as to clamp out any residual signal appearing across the storage capacitance after the encoding. Indeed, so far, this has been the only way of limiting the cross-talk between channels.

Encoding circuitry capable of being employed in a feedback type PCM encoder is known. Such known circuitry algebraically adds a sample analog signal to a succession of other analog signals derived from the previous coded sample which is provided by a digital-to-analog converter contained in the feedback circuit of the feedback comparator PCM so as to code the samples analog signal.

SUMMARY OF THE INVENTION

An object of the present invention is to provide a pulse code modulation encoder of the feedback comparison type employing improved versions of the above mentioned amplifier circuit, storage circuit and encoding circuit.

A feature of the present invention is the provision of a pulse code modulation encoder of the feedback comparator type to encode a plurality of sequential analog signal samples comprising: an input amplifier circuit including an input for the samples, a first amplifier coupled to the input, and switching means coupled to the first amplifier to select one of a high and a low gain value for the first amplifier, the switching means having a variable inpedance coupled across the output of the first amplifier; a storage circuit including a second amplifier coupled to the output of the first amplifier, the second amplifier, being a first differential amplifier having two output terminals and a storage reactance coupled between the two output terminals; and an encoding circuit including a second differential amplifier coupled across the storage reactance to deliver differential current outputs proportional to the magnitude of the voltage presently stored in the storage reactance in response to a present one of the samples, input terminals to deliver a succession of current inputs proportional to the magnitude of the voltage previously stored in the storage reactance in response to a previous one of the samples, first means coupled to the second differential amplifier and the input terminals to algebraically add the current outputs to the current inputs, and a binary voltage comparator coupled to the first means to receive a balanced voltage from the first means proportional to the results of the algebraic addition and to provide a binary code at the output of the comparator representative of the magnitude of the balanced voltage; and switching means rendering the first amplifier inoperative during the time the present one of the samples is being stored in the storage reactance to prevent cross-talk between the present one of the samples and the next succeeding one of the samples.

Another object of this invention is to provide a switched amplifier of the general type described above but such that one of the two gain values can be very low.

Another feature of the present invention is the provision of an amplification circuit for an electrical signal comprising: an input for the signal; an amplifier coupled to the input; and switching means coupled to the amplifier to select one of a high and low gain value for the amplifier, the switching means having a variable impedance coupled across the output of the amplifier.

A further feature of the present invention is the provision of a first differential amplifier as the above mentioned amplifier, and a second differential amplifier connected to have a substantial amount of negative feedback so as to possess a relatively low output impedance as the above mentioned variable impedance with the above mentioned switching means further including a source of substantially constant current, a control signal input with control signal having two states, a first switching device coupled to the control signal input, the current source and one of the first and second differential amplifiers to couple the constant current to the one of the first and second differential amplifiers in response to one state of the control signal and a second switching device coupled to the control signal input, the current source and the other of the first and second differential amplifiers to couple the constant current to the other of the first and second differential amplifiers in response to the other of the states of the control signal.

Realized in this manner, such a switched amplifier may now be used along the highway of a PCM encoding circuit in order to effectively isolate the sample voltage present on the highway at the input of the amplifier corresponding to one particular channel, from the signal taken from the previous channel and stored across a capacitance while being encoded into PCM signals. Indeed, when the second differential amplifier of the switching means is made operative and coupled across the output of the first differential amplifier which has been made inactive during that period, the negative feedback circuit providing the second differential amplifier with a very low impedance will prevent any undesired transfer of signals from the highway due to spurious capacitive bypass around the blocked first differential amplifier. Such a solution also offers the advantage that the analog circuits preceding the encoder can be balanced with respect to ground due to the use of differential amplifiers, both in order ot provide the necessary amplification during the active cycle of the amplifier and while the latter is blocked. Such a solution reduces the sensitivity to noise generated not only in the multiplex part of the circuit but also that coming from external sources such as DC/DC converters, signalling devices and switching devices. Additionally, with balanced sample storage, the switching operations on the analog signal which are necessary so as to encode the latter into the PCM code corresponding to the analog value, can best be performed also be differential amplifiers which provide a degree of decoupling between the control voltages and the analog path.

In like manner, by using differential amplifiers both for the active part of the amplification circuit and for that part of the switching means used to complete the blocking of the amplification circuit, and by feeding either of the two differential amplifiers used in this manner from a common current source, it will also be clear that the switching operation from the active to the blocked state will not cause any appreciable transient voltages since the total current supplied to the two differential amplifiers is kept constant.

Still another object of the present invention is to improve on the above mentioned storage circuit and more particularly, to provide such a storage circuit that is substantial immunity from noise signals and eliminates clamping arrangements of the prior art.

Still another feature of the present invention, is the provision of a storage circuit for an electrical signal comprising: an input for the signal; a differential amplifier coupled to the input, the amplifier having two output terminals; and a storage reactance coupled between the two output terminals.

Still a further feature of the present invention is the provision of a gated switching means coupled to the two output terminals to control the flow of output currents from the differential amplifier.

According to another feature of the present invention the gated switching means provides a substantially constant current to the output terminals from a common generator.

In this manner, there is not only a balanced arrangement due to the fact that the storage capacitance is fed from the outputs of a differential amplifier but the latter remains inactive until the switching means to supply the currents to the output terminals of the differential amplifier are made active. This current may then be drawn through the storage capacitance in one direction or the other depending on the polarity of the voltage impressed at the input of the differential amplifier and a linear charge of the storage capacitance may be achieved until the voltage thereacross is equal in value to that of the new sample present at the input of the differential amplifier. No separate clamping arrangement requiring extra measures to avoid cross-talk between channels need be provided and the sampled voltage may remain across the storage capacitance while the differential amplifier is not supplied with current.

Still a further object of the present invention is to provide an improved encoding circuit of the above mentioned type which is less sensitive to noise and exhibits a high degree of cross-talk immunity.

Another feature of the present invention is the provision of an encoding circuit for a plurality of samples of an analog signal comprising: an input for the samples; a differential amplifier coupled to the input to deliver differential current outputs proportional to the magnitude of the present one of the samples; input terminals to deliver a succession of current inputs proportional to the magnitude of the previous one of the samples; means coupled to the differential amplifier and the input terminals to algebraically add the current outputs and the current inputs; and a binary voltage comparator coupled to the means to receive a balance voltage from the means proportional to the results of the algebraic addition and to provide a binary code at the output of the comparator representative of the magnitude of the balanced voltage.

With such a balanced circuit approach, the common mode rejection of the differential amplifier can be made particularly high by supplying it with a constant current source common to the two halves of the balanced amplifier.

In accordance with a preferred embodiment of the invention, a PCM encoder circuit includes a storage capacitance providing a voltage to a high input impedance balanced FET voltage amplifier part of the comparison and coding circuits and this storage capacitance is isolated from the input highway on which the channel samples successively appear by a switched input amplifier arrangement using differential amplifiers throughout. A first input differential amplifier passes the signal from the highway to a second differential amplifier using emitter follower circuits having their outputs coupled to respective terminals of the storage capacitance and to transistor switches connected to a constant current source. Additionally, the differential amplifier connected to the highway has its output terminals commoned with those of a like differential amplifier receiving no input signal which is provided with negative shunt feedback so as to afford a very low output impedance when it is made operative under the control of further switching means coupling another source of constant current either to the input differential amplifier or to the low output impedance device short circuiting its output terminals of the input differential amplifier.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
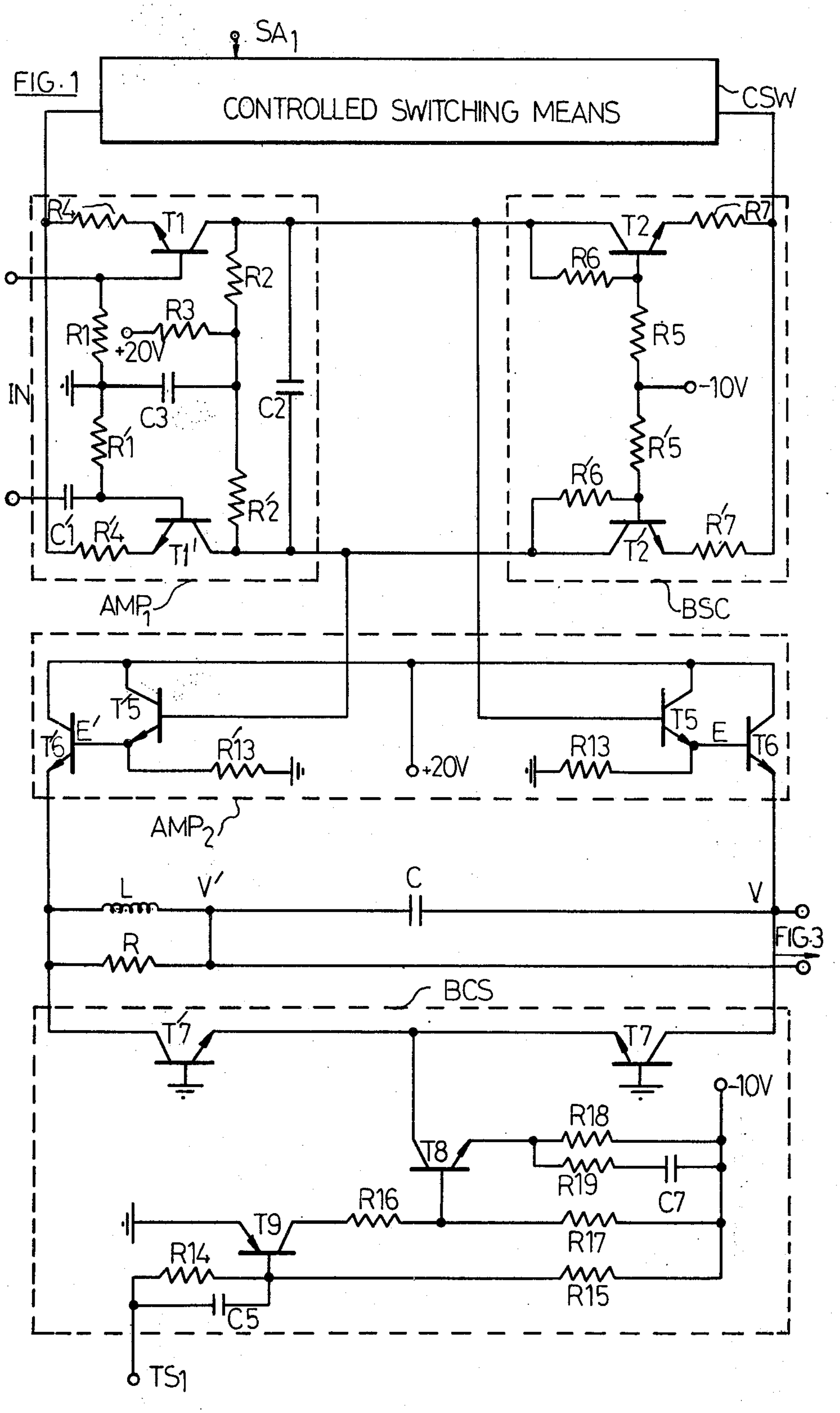
FIG. 1 is a schematic diagram of the gated input amplifier circuit and isolated capacitor storage circuit for a feedback type PCM encoder in accordance with the principles of the present invention.

Referring to FIG. 1, the input IN of the circuit which may come from a highway on which various samples from the different channels successively appear during channel time slots is connected to the input of a first amplifier AMP1. As shown, amplifier AMP1 is a differential amplifier using the two like NPN transistors T1 and T'1 whose bases are connected to the input terminals, with the base of transistor T'1 being connected to the input by capacitor C'1. The bases of transistors T1 and T'1 are biased to ground through resistors R1 and R'1. The collectors of transistors T1 and T'1 are coupled to a source of +20V through the individual resistors R2 and R'2 and the common resistor R3. A capacitor C2 is coupled across the output of amplifier AMP1, i.e. connected between the collectors of transistors T1 and T'1, removes undesirable high frequency components from the amplified sample between the collectors. The junction point of the three resistors R2, R'2 and R3 is decoupled to ground through capacitor C3. Finally, the emitters of transistors T1 and T'1 are coupled to a control lead for amplifier AMP1 through the respective emitter resistors R4 and R'4.

Figure 2:
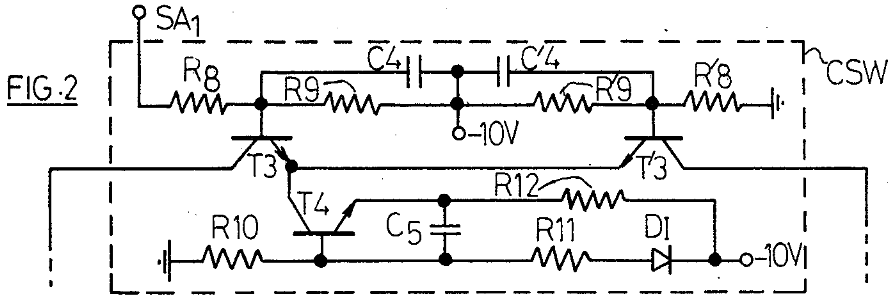
FIG. 2, is a schematic diagram of the controlled current switching means CSW illustrated in block form in FIG. 1 in accordance with the principles of the present invention.

As shown, the control lead comes from the controlled switching means CSW which is shown in detail in FIG. 2 and which can selectively provide a constant current to the control lead when it is desired to make the amplifier AMP1 operative to act on the input sample. Outside the active period of amplifier AMP1 during which it amplifies the sample voltage present on the highway, this amplifier should block any signal present thereat.

In order to achieve this and at the same time ensure an adequate amount of common mode rejection so as to cancel noise signals which may be present on the two input terminals simultaneously, not only is amplifier AMP1 a differential amplifier, but a similar differential amplifier constituting the balanced short circuit means BSC is provided as shown in FIG. 1. Circuit means BSC is also driven by a control lead from switching means CSW detailed in FIG. 2. Switching means CSW operates is such a way that depending upon the condition of the control voltage at terminal SA1 of means CSW, means CSW provides a constant current either to amplifier AMP1 or to the balanced short circuit means BSC.

Means BSC is also a differential amplifier including NPN transistors T2 and T'2. The bases of transistors T2 and T'2 are biased to −10V through resistors R5 and T'5 which are part of a negative shunt feedback circuit including also the resistors R6 and R'6 interconnecting each collector to the base of the same transistor. As for amplifier AMP1, the emitters of transistors of transistors T2 and T'2 are coupled to a control lead coming from means CSW through the individual resistors R7 and R'7.

Normally, it is the output terminal of the switching means CSW shown in detail in FIG. 2 which receives current to make the balanced short circuit means BSC operative. In such a case, output impedance of means BSC between the collectors of transistors T2 and T'2 is quite small due to the employed shunt feedback. This output impedance is in fact equal to the sums of the emitter resistors R7 and R'7, including the equivalent emitter resistances of transistors T2 and T'2, multiplied by a factor equal to the ratio between the sum of resistances of resistors R5 and R6 and the resistance of resistor R5, assuming that the circuit shown is symmetrical. In this manner, the output impedance at the collectors of transistors T2 and T'2 can be made suitably low in order to effectively short circuit the output of the inactive amplifier AMP1. This is useful because even though this amplifier may be inactive, stray capacitance couplings between its input terminals IN and the collectors of transistors T1 and T'1 might otherwise lead to the appearance of undesired spurious signals between the collectors. The limit as to the lowest value allowable for resistors R5 and R'5 is determined by stability considerations for the negative feedback amplifier constituting means BSC.

Alternatively, when amplifier AMP1 is to be made operative, switching means CSW shown in detail in FIG. 2 will provide for current to be routed towards the emitters of transistors T1 and T'1 instead of transistors T2 and T'2, and this will occur upon an appropriate control signal being impressed at control terminal SA1 of means CSW.

Figure 4:
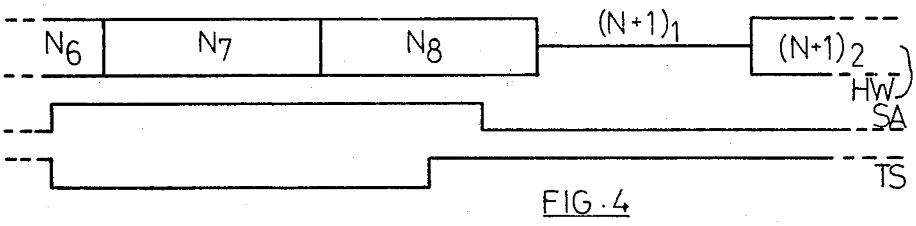
FIG. 4 illustrates waveforms of control signals applied to the circuit of FIG. 1.

The control signal applied at terminal SA1 is illustrated in FIG. 4 together with two other waveforms and in particular one labelled HW which illustrates how the amplitude samples appear on the common highway. As shown, each channel period is divided into eight time slots of which the last three, i.e. $N_6$, $N_7$ and $N_8$ are partially represented for the Nth sample, the first two out of the eight time slots, i.e. $(N+1)_1$ and $(N+1)_2$ being partially represented for the next (N + 1) th sample. These time slots correspond to the eight bits which will be used to code the amplitude sample into a PCM signal in accordance with known methods with which the present invention is not concerned.

As shown, the control waveform SA goes high during a time interval corresponding to two out of eight time slots towards the end of a time channel assigned to the appearance of an amplitude sample on the common highway. It is during that time that the voltage present on the highway should be amplified and passed along to further circuits by means of amplifier AMP1. Outside of this interval, that is, when SA is low, amplifier AMP1 should be blocked as explained and moreover this should occur in a really effective manner to avoid the appearance of any significant spurious signal at the output of amplifier AMP1. Otherwise, during the subsequent N+1 time interval, the (N +1)th amplitude sample then present on the highway could interfere with the coding of the previous Nth sample taken from the highway and stored in the manner which will be described later. This is done to permit coding of the amplitude sample into a PCM signal of eight bits.

When amplifier AMP1 becomes operative under the control of SA going high, the output impedance across the collectors is no longer provided by BSC but by the output impedance of amplifier AMP1 which will be substantially equal to the sum of the collector resistors R2 and R'2. At that time the gain of amplifier AMP1 will be equal to the ratio between the collector resistors, i.e. $R_2 = R'_2$, and the emitter resistance, e.g. resistor R4 plus the equivalent emitter resistance of transistor T1.

FIG. 2 illustrates the schematic diagram for means CSW constituting the source of current which may be switched either towards amplifier AMP1 or towards means BSC under the action of control waveform SA. The control signal applied to terminal SA1 reaches the base of NPN transistor T3 through resistor R8 and when signal waveform SA is low, the voltage at the base of transistor T3 is negative with respect to ground so that NPN transistor T'3 having its base coupled by a like resistor R'8 to ground is then conductive. This means that the constant current supplied at the collector of NPN transistor T4 can flow through transistor T'3 so that the constant current will be supplied by the collector of transistor T'3 towards the balanced short circuit means BSC of FIG. 1. The bases of transistors T3 and T'3 are biased to −10V through resistors R9 and R'9 which are decoupled by capacitors C4 and C'4, respectively.

Transistors T3 and T'3 are supplied by the constant current provided at the collector of NPN transistors T4 which has its base biased by a resistive potentiometer between ground and −10V consisting of resistor R10 in series with resistor R11 and diode D1 poled as shown. The emitter of transistor T4 is biased to −10V through resistor R12 and this emitter is decoupled to the base via capacitor C5.

Thus, upon the waveform SA becoming high, the positive pulse at input terminal $SA_1$ will render transistor T3 conductive while transistor T'3 will now be blocked. This will switch the constant current provided by transistor T4 to amplifier AMP1 which will then provide an amplified version of the analog sample voltage of the highway.

This amplified voltage at the collectors of transistors T1 and T'1 (FIG. 1) is applied to a further differential amplifier AMP2 which as illustrated is also a gated amplifier supplied with a constant current. This constant current comes from balanced current supply device BCS which is controlled at input terminal TS1 by a further control waveform TS illustrated also in FIG. 4.

As shown in FIG. 1, the differential amplifier AMP2 includes pairs of like NPN transistors T5 and T'5 and transistors T6 and T'6 which are coupled as cascaded emitter followers T5 and T6 and emitter followers T'5 and T'6 with the emitters of transistors T5 and T'5 which are directly connected to the bases of transistors T6 and T'6 being respectively biased to ground through resistors R13 and R'13. All four collectors are directly biased to +20 V. The emitters of transistors T6 and T'6 constitute the output terminals which are coupled to the storage capacitor C. These emitters also receive current through NPN transistors T7 and T'7 included in the balanced current supply device BCS. Transistors T7 and T'7 have their bases directly grounded and their emitters are commoned to the collector of NPN transistors T8 which is the output transistor of a constant current arrangement including PNP transistor T9.

Transistor T9 is controlled by the waveform TS appearing at input terminal TS1 of device BCS. This control terminal is connected to the base of transistor T9 through resistor R14 shunted by capacitor C6. The base of transistor T9 is coupled to −10V through resistor R15 while the emitter of transistor T9 is directly grounded. Normally, as long as waveform TS is high, transistor T9 is blocked. In turn, since the collector of transistor T9 is also biased to −10 Volts through resistors R16 and R17 in series and the junction point of resistors R16 and R17 is coupled to the base of output NPN transistor T8, transistor T8 is also normally blocked.

Upon waveform TS becoming low (FIG. 4) at the same time that waveform SA becomes high to make amplifier AMP1 operative, amplifier AMP2 will also become operative due to both transistors T9 and T8 being unblocked and supplying constant current at the collector of transistor T8. This current will divide due to the parallel paths provided by transistors T7 and T'7. Upon the voltage at input terminal TS1 being lowered, capacitor C6 will be helpful to speed up the response of transistor T9 whereas on the other hand, the emitter of transistor T8 is biased to −10 Volts not only through resistor R18 but also via a circuit shunting resistor R18 including resistor R19 in series with capacitor C7. This series combination will provide an extra amount of current to switch transistor T8 on.

It is to noted that storage capacitor C is coupled between the emitters of transistors T6 and T'6 through an inductance L which is shunted by a small resistor R. This plays no essential part in the basic arrangement which may be considered as involving a direct connection of storage capacitor C between the transistor emitters. However, the serial insertion of the shunt LR combination has been found beneficial in certain circumstances where a very high amount of cross-talk immunity is desired. In that case, the addition of this circuit can produce a slight overshoot in the discharge characteristic of the storage capacitor C and this leads to beneficial effects with respect to compensation of an eventual residual voltage across storage capacitance C. This crosstalk effect between sample N and the next sample (N+1) due to a residual part of the sample being left across storage capacitor C after coding, is essentially due to the spurious capacitances to ground at each plate of capacitor C which may be of unequal value.

Figure 5:
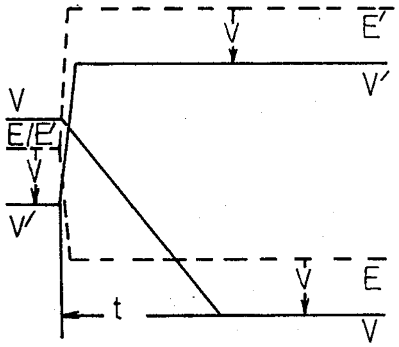
FIG. 5 illustrates a set of waveforms useful in explaining the storage of a new sample across the capacitor of FIG. 1.

The basic operation of the circuit of FIG. 1, under the assumption that storage capacitor C is directly connected to the collectors of transistors T6 and T'6 and transistors T7 and T'7 will now be examined in relation to the voltage vs. time diagram of FIG. 5. On the left hand side of this diagram, the voltage levels at the collectors and the bases of the transistors T6 and T'6 have been illustrated as they might stand before the control waveform TS (FIG. 4) becomes low to activate the balanced current supply device BCS of FIG. 1.

As long as TS is high, amplifier AMP2 is inoperative, its gated constant current supply provided by device BCS being unavailable since transistors T8 and T9 are blocked. At that moment, calling V the potential on the right hand plate of storage capacitor C, i.e. on the side of the emitter of transistor T6, and V' that on the left hand plate, i.e. on the side of the emitter of transistor T'6, the voltage difference V—V' which is present across the storage capacitor C corresponds to the previous highway voltage sample impressed on this storage capacitor and coded with the help of suitable known coding devices coupled across capacitor C with the help of a suitable amplifier and comparator arrangement which is detailed in FIG. 3 and will be described later. For the moment, it can be assumed that the input impedance of this amplifier and comparator device is so high that only a very small leakage current is able to flow through the output terminals connected to storage capacitor C. With NPN transistors used for transistors T6 and T'6, in such a case, the least positive plate of C will tend to assume a voltage slightly below that present at the bases of transistors T6 and T'6 in their quiescent condition. This plate has been assumed to be V' which is shown in FIG. 5 to be less positive than the base potential E and E' of transistors T6 and T'6, respectively, by an amount v which in practice can be assumed to be equal to 0.7 volt.

As soon as transistors T6 and T'6 become conductive by virtue of waveform TS going low and rendering the balanced current supply device BCS conductive due to the application of a negative potential at terminal TS1, the potentials V and V' will be modified. Indeed, at that moment also, waveform SA has become high (FIG. 4) which means that an amplified replica of the new sample voltage on the highway is now impressed across the bases of transistors T5 and T'5 and, accordingly, on the bases of transistors T6 and T'6 where it leads to the respective potentials E and E'. Assuming that as shown in FIG. 5, the new potential E' is more positive than the new potential E, it is the potential V' at the emitter of transistor T' 6 corresponding to potential E' at its base which will rapidly jump to follow this new most positive value at the base, keeping a difference of v volt due to the drop across the base-emitter junction of transistor T'6.

At the same time, the current flowing through transistor T7 starts the discharge of capacitor C and in view of a constant discharge current being supplied, the potential variation of V will be linear as shown in FIG. 5. This linear change for V will continue until the potential at the emitter of transistor T6 is established at a level of v volt more negative than the potential E at the base of transistor T6. At that moment, transistor T6 also becomes conductive and clamps the potential V to the indicated value.

In this manner, after a time t which may be very small if a suitably high rate of linear discharge is provided, the new potential difference which will be established across the storage capacitor C will be equal to the amplitude of the sample impressed after amplification by amplifier AMP1 between the bases of transistors T6 and T'6, there being a level shift of v volt. The linear rate of discharge should be such that for the most extreme change for the V (or V') potential, i.e. from the most positive to the most negative value or vice versa, the time t should not exceed the fraction of time during which waveform TS (FIG. 4) goes low. This mode of operation offers the considerable advantage that any undesired signal which might occur at either of the bases of transistors T6 and T'6 during the time the voltage across the storage capacitor C acquired its new value, will not affect the final value of the stored sample. The situation would be entirely different if C were charged from a low impedance source. Then, the charging characteristic would be exponential and any unwanted signal would be reflected in the stored sample with an attenuation depending on the instant of its occurrence.

After TS goes high again, amplifier AMP2 is made inoperative and provided the amplifier and encoding circuit coupled across the plates of the storage capacitor C offers a high enough impedance, the storage capacitor will maintain the voltage difference attained until a new sample is impressed through amplifier AMP2. Shortly after waveform TS goes high again, waveform SA (FIG. 4) again goes low and this will restore the balanced short circuit device BSC to its active status thereby preventing the voltage on the highway from affecting the stored voltage sample now being coded.

Although this coding operation using an encoder of the feedback comparison type will not be described here, since reference may be made to previously published systems of this kind and in particular to U.S. Pat. No. 3,582,941, the high impedance amplification and comparison circuit coupled across storage capacitor C will now be described.

Figure 3:
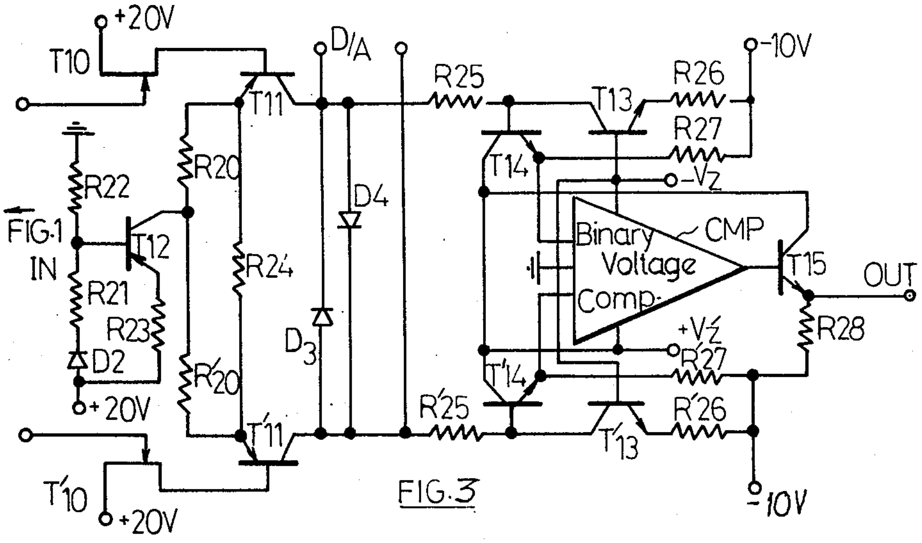
FIG. 3 is a schematic diagram of the encoding circuitry including an amplifier comparison arrangement connected to the storage capacitor of FIG. 1 in accordance with the principles of the present invention.

FIG. 3 represents the circuit of this arrangement in which the input terminals coupled to the plates of capacitor C (FIG. 1) are directly connected to a dual FET transistor element T10 and T'10 which as shown is biased to + 20 V and operates as a dual source follower. This differential amplifier arrangement provides a very high input impedance and depending on the type of FET transistors used, additional resistors may eventually be used between the input terminals connected to the storage capacitor plates and the source of + 20 V.

The purpose of this amplification arrangement is essentially to translate the voltage across C into a current flowing into the output circuit of the digital-to-analog converter (not shown) supplying a a balanced current at the input indicated by D/A in FIG. 3. At the same time, the amplification arrangement of FIG. 3 should provide an input impedance which does not appreciably load C.

The signal present between the sources of transistors T10 and T'10 is applied to the bases of two PNP transistos T11 and T'11 which form a differential amplifier with a high common mode rejection due to its total emitter current being supplied from a constant current source constituted by an arrangement including PNP transistor T12. Transistor T12 has its collector coupled to the emitters of transistors T11 and T'11 through resistors R20 and R'20. Transistor T12 has its base biased by means of potentiometer or a voltage divider including resistors R21 and R22 serially connected between the source of +20 V and ground, resistor R21 being in series with diode D2 poled as shown. Transistor T12 supplying the constant current has its emitter biased to +20 V through resistor R23 and finally, a resistor R24 appears between the emitters of transistors T11 and T'11 for the purpose of adjusting the effective impedance between the emitters of these transistors. Indeed, this impedance determines the amount of constant output current which is delivered in response to the input voltage and such an adjustment as provided by resistor R24 is helpful to match eventual variations in the input current to input (D/A), which is the output current of the feedback digital-to-analog converter (not shown). Indeed, as shown in FIG. 3, the collector outputs of the differential amplifier including transistors T11 and T'11 are used as insertion points for the balanced current coming from the digital-to-analog converter. The algebraic sums of the current corresponding to the samples analog signal at the collectors of transistors T11 and T'11 and the current received from the ditital-to-analog converter flow through resistors R25 and R'25 which interconnect the collectors of transistors T11 and T'11 to the bases of the NPN transistors T14 and T'14, respectively.

The function of the digital-to-analog converter is to build up an analog signal which, after each binary decision, is applied to the comparator input in opposition to the signal from the sensing amplifier (transistors T11 and T'11) corresponding to the voltage stored across capacitor C (FIG. 1) in order to prepare the next binary decision. Such PCM incoder systems of the feedback comparison type are already well known. The sample voltage to be encoded is successively compared to reference voltages which are progressively built up in a digital-to-analog converter in the feedback path in such a way that each step in the encoding process brings the reference voltage closer to the sample voltage and the successive binary results of the comparisons give the code of the sample voltage. A digital-to-analog converter particularly suitable for use in connection with the arrangement of FIG. 3 is that disclosed in the U.S. Pat. No. 3,582,941 already mentioned, and wherein the output analog current, i.e. at terminals D/A, flows out of two separate ladder networks fed at suitable points by appropriate current sources. With an 8-bit PCM coding arrangement, there will be eight binary decisions to be taken after the control waveform SA (FIG. 4) has returned to the low condition. The time spacings at which these decisions are taken need not be equidistant but may be determined in such a way as to improve the linearity. The first bit can be related to the polarity of the sample, the next three may define the applicable segment of the compression characteristic for the PCM coding arrangement, while the last four bits may define the $2^4 = 16$ steps within each segment.

The combined currents flowing through resistors R25 and R'25 should give rise to sufficient voltages to trigger the binary voltage comparator CMP into one or the other binary condition. Thus, the function of comparator CMP is to provide a binary output signal which is determined by the sign of the voltage difference appearing between the collectors of transistors T11 and T'11. Between these points, FIG. 3 shows that two oppositely poled diodes D3 and D4 have been connected in parallel opposition with one another so as to limit both the positive and negative voltage excursions between the collectors. Otherwise, non-linear effects might occur in the digital-to-analog converter.

Since comparator CMP is a high speed integrated circuit, e.g. of the LM306 type, the average DC voltage between the collectors of transistors T11 and T'11 is too positive to be applied directly to comparator CMP and, accordingly, resistors R25 and R'25 cooperate with the NPN transistors T13 and T'13 in providing predetermined DC voltage drops across the resistors R25 and R'25. Transistors T13 and T'13 provide currents to go through resistors R25 and R'25 which can be closely adjusted with the help of the emitter resistor R26 and R'26 and with the help of the voltage $-V_Z$ which biases the bases of transistors T13 and T'13. This voltage $-V_Z$ can be obtained with the help of a suitable Zener diode arrangement (not shown) with the Zener diode connected in series with a resistor between the −10 Volts supply and ground, and with the Zener diode decoupled by a capacitor. In this manner, with adjustable emitter resistors R26 and R'26, it is possible to secure a close equalization of the voltages at the collectors of transistors T11 and T'11 in the absence of current from the D/A input and with the encoder input shorted.

Transistors T14 and T'14 function as a dual emitter follower to transfer the DC shifted differential voltage to the comparator CMP input. This provides the low driving impedance which is required to obtain a fast comparator response. As shown, the commoned collectors of transistors T14 and T'14 are biased to $+V'_Z$ which is obtained from a suitable Zener diode arrangement in the same manner as $-V_Z$ but this time using ground and the + 20 Volts supply. The emitters of transistors T14 and T'14 are biased to − 10 V through the individual resistors R27 and R'27. Apart from ground, the supply voltages for the comparator CMP are $-V_Z$ and $+V_Z$ already mentioned and as shown, an emitter follower using NPN transistor T15 may be connected at the output of comparator CMP so as to achieve a slight improvement on its sensitivity. The emitter follower using transistor T15 has its base directly connected to the output of comparator CMP, its collector biased to $+V'_Z$ volts and its emitter returned to the −10 V supply through resistor R28. The binary output signals appearing successively at the emitter of transistor T15, i.e. at the OUT terminal, may then be routed to a series of eight flip-flops (not shown) in order to store the serially obtained PCM code corresponding to the analog voltage across capacitor C (FIG. 1).

As already noted, the linearity of the encoder can be improved by adopting variable intervals between the comparator decisions and these may be calculated in order to optimize the overall accuracy, taking into account both the response time of the digital-to-analog converter for large signal variations and the response time of the comparator CMP for small differential input signals. For instance, in an arrangement of the type considered in which the first bit determines the polarity of the sample, the next three bits the applicable segment of the compression characteristic and the last four bits define the sixteen steps within each segment, the eight comparator decisions relative to sample N taken during the time sample (N +1) has appeared on the highway (FIG. 4) can be taken at times 0.25, 1.25, 2.25, 3, 3.75, 4.50, 5 and 5.75 taking time 0 as the starting time of the (N +1) time slot and eight unit times corresponding to a full channel time slot as shown in FIG. 4, so that the last decision is taken at the end of the low period for waveform SA. Then, during the time sample (N+2) appears on the highway, the eight two-value pulses corresponding to the coded sample and to the values stored in the eight flip-flops can be successively transmitted.

While I have described above the principles of my invention in connection with specific apparatus it is to be clearly understood that this description is made only by way of example and not as a limitation to the scope of my invention as set forth in the objects thereof and in the accompanying claims.

I claim:

1. A pulse code modulation encoder of the feedback comparator type to encode a plurality of sequential analog signal samples comprising:
an input amplifier circuit including
an input for said samples,
a first amplifier coupled to said input, and
switching means coupled to said first amplifier to select one of a high and a low gain value for said first amplifier, said switching means having a variable impedance coupled across the output of said first amplifier;
a storage circuit including
a second amplifier coupled to the output of said first amplifier, said second amplifier being a first differential amplifier having two output terminals, and
a storage reactance coupled between said two output terminals; and
an encoding circuit including
a second differential amplifier coupled across said storage reactance to deliver differential current outputs proportional to the magnitude of the voltage presently stored in said storage reactance in response to a present one of said samples,
input terminals to deliver a succession of current inputs proportional to the magnitude of the voltage previously stored in said storage reactance in response to a previous one of said samples,
first means coupled to said second differental amplifier and said input terminals to algebraically add said current outputs to said current inputs, and
a binary voltage comparator coupled to said first means to receive a balanced voltage from said first means proportional to the results of said algebraic addition and to provide a binary code at the output of said comparator representative of the magnitude of said balanced voltage;
said switching means rendering said first amplifier inoperative during the time said present one of said samples is being stored in said storage reactance to prevent cross-talk between said present one of said samples and the next succeeding one of said samples.

2. An encoder according to claim 1, wherein
said first amplifier includes
a third differential amplifier;
said variable impedance includes
a fourth differential amplifier connected to have a substantial amount of negative feedback so as to possess a relatively low output impedance; and
said switching means further includes
a source of substantially constant current,
a control signal input, said control signal having two states,
a first switching device coupled to said control signal input, said source and one of said third and fourth differential amplifiers to couple said constant current to said one of said third and fourth differential amplifiers in response to one of said states of said control signal, and
a second switching device coupled to said control signal input, said source and the other of said third and fourth differential amplifiers to couple said constant current of said other of said third and fourth differential amplifiers in response to the other of said states of said control signal.

3. An encoder according to claim 2, wherein
said third differential amplifier includes
first and second transistors connected in a grounded emitter configuration and to one of said first and second switching devices,
a first resistor connected between a first given potential and the base of one of said first and second transistors,
a second resistor connected between said first given potential and the base of the other of said first and second transistors, and
said input is connected to the base of both said first and second transistors;
said fourth differential amplifier includes
third and fourth transistors connected in a grounded emitter configuration and to the other of said first and second switching devices,
a third resistor connected between the base and collector of said third transistor, the collector of said third transistor being connected to the collector of one of said first and second transistors,
a fourth resistor connected between the base and collector of said fourth transistor, the collector of said fourth transistor being connected to the collector of the other of said first and second transistors,
a fifth resistor connected between the base of one of said third and fourth transistors and a second given potential different than said first given potential, and
a sixth resistor connected between the base of the other of said third and fourth transistors and said second given potential.

4. An encoder according to claim 11, wherein
said storage reactance is a capacitor having neither terminal connected to a point of fixed potential.

5. An encoder according to claim 4, wherein
said storage circuit further includes
a gated switching means coupled to said two output terminals to control the flow of output currents from said second differential amplifier.

6. An encoder according to claim 5, wherein
said gated switching means includes
a source of substantially constant current, and
second means coupled to said source and said two output terminals to supply a substantially constant current to said two output terminals.

7. An encoder according to claim 6, wherein said first differential amplifier includes a first transistor having its base connected to one of said two outputs of said first amplifier, a second transistor having its base connected to the emitter of said first transistor, its collector connected to the collector of said first transistor and its emitter as one of said two output terminals, a first resistor connected between ground and the base of said second transistor, a third transistor having its base connected to the other of said two outputs of said first amplifier, a fourth transistor having its base connected to the emitter of said third transistor, its collector connected to the collector of said third transistor and its emitter as the other of said two output terminals, a second resistor connected between ground and the base of said fourth transistor, and said capacitor has one plate connected to the emitter of one of said second and fourth transistors and the other plate connected to the emitter of the other of said second and fourth transistors such that the potential at said one plate jumps towards the potential present at the base of said one of said second and fourth transistors and the potential at said other plate varies linearly towards the potential present at the base of said other of said second and fourth transistors until both of said second and fourth transistors become conductive.

8. An encoder according to claim 7, further including an inductor connecting said capacitor to the emitter of said one of said second and fourth transistors.

9. An encoder according to claim 8, further including a third resistor connected in shunt relation to said inductor.

10. An encoder according to claim 9, wherein said capacitor has an overshoot in its discharge characteristic due to the presence of said inductor, said overshoot compensating for a residual voltage across said capacitor resulting from the voltage stored in said capacitor prior to said output currents being allowed to flow so as to store a new voltage in said capacitor.

11. An encoder according to claim 1, wherein said first means includes a first resistor coupled to one output of said second differential amplifier and one of said input terminals, a second resistor coupled to the other output of said second differential amplifier and the other of said input terminals, said first and second resistors algebraically adding said current outputs and said current inputs, a first emitter follower coupled between said first resistor and said comparator, and a second emitter follower coupled between said second resistor and said comparator, said first and second emitter followers providing said balanced voltage.

12. An encoder according to claim 11, further including a constant current generator coupled in common to said second differential amplifier.

13. An encoding circuit for a plurality of samples of an analog signal comprising:

an input for said samples;

a differential amplifier coupled to said input to deliver differential current outputs proportional to the magnitude of the present one of said samples;

input terminals to deliver a succession of current inputs proportional to the magnitude of the previous one of said samples;

means coupled to said differential amplifier and said input terminals to algebraically add said current outputs and said current inputs; and a binary voltage comparator coupled to said means to receive a balanced voltage from said means proportional to the results of said algebraic addition and to provide a binary code at the output of said comparator representative of the magnitude of said balanced voltage.

14. A circuit according to claim 13, wherein said means includes a first resistor coupled to one output of said differential amplifier and one of said input terminals, a second resistor coupled to the other output of said differential amplifier and the other of said input terminals, said first and second resistors algebraically adding said current outputs and said current inputs, a first emitter follower coupled between said first resistor and said comparator, and a second emitter follower coupled between said second resistor and said comparator, said first and second emitter followers providing said balanced voltage.

15. A circuit according to claim 14, further including a constant current generator coupled in common to said differential amplifier.

* * * * *